US012762381B1

(12) United States Patent
Karmon et al.

(10) Patent No.: US 12,762,381 B1
(45) Date of Patent: Oct. 13, 2026

(54) IMPORTANCE SIGNALING TOKENS IN GENERATIVE NEURAL NETWORK CONTEXT BLOCKS

(71) Applicant: GDM Holding LLC, Mountain View, CA (US)

(72) Inventors: Danny Karmon, Petah Tikva (IL); Ilia Labzovsky, Tel Aviv-Jaffa (IL)

(73) Assignee: GDM Holding LLC, Mountain View, CA (US)

( * ) Notice: Subject to any disclaimer, the term of this patent is extended or adjusted under 35 U.S.C. 154(b) by 0 days.

(21) Appl. No.: 19/190,505

(22) Filed: Apr. 25, 2025

(51) Int. Cl.
*G06F 16/95* (2019.01)
*G06F 16/953* (2019.01)
*G06N 3/0475* (2023.01)
*G06N 3/092* (2023.01)

(52) U.S. Cl.
CPC ......... *G06N 3/0475* (2023.01); *G06F 16/953* (2019.01); *G06N 3/092* (2023.01)

(58) Field of Classification Search
CPC ........ G06N 3/0475; G06N 3/04; G06N 3/047; G06N 3/092; G06N 3/08; G06F 16/951; G06F 16/953
See application file for complete search history.

(56) References Cited

U.S. PATENT DOCUMENTS 12,499,115 B1 * 12/2025 Niu ................... G06F 16/24578
12,536,439 B2 * 1/2026 Borgeaud Dit Avocat .................. G06N 3/0455
2025/0190460 A1 * 6/2025 Madisetti ............ G06F 16/3329
2025/0259042 A1 * 8/2025 Crabtree ................ G06N 3/047
2026/0024038 A1 * 1/2026 Iyer .................. G06Q 10/06316
2026/0057016 A1 * 2/2026 Vouitsis .................. G06F 16/93
2026/0072920 A1 * 3/2026 Lewis ............... G06F 16/24578
2026/0087036 A1 * 3/2026 Patthar ................ G06F 16/3329

OTHER PUBLICATIONS

Adiwardana et al., "Towards a Human-like Open-Domain Chatbot," CoRR, Submitted Jan. 2020, arXiv:2001.09977v1, 38 pages.
Alayrac et al., "Flamingo: a Visual Language Model for Few-Shot Learning," CoRR, Submitted on Apr. 2022, arXiv:2204.14198v1, 66 pages.
Anil et al., "PaLM 2 Technical Report," CoRR, Submitted on May 2023, arXiv:2305.10403v1, 93 pages.
Chen et al., "PaLI: A Jointly-Scaled Multilingual Language-Image Model," CoRR, Submitted on Sep. 2022, arXiv: 2209.06794v1, 30 pages.

(Continued)

*Primary Examiner* — Merilyn P Nguyen
(74) *Attorney, Agent, or Firm* — Fish & Richardson P.C.

(57) ABSTRACT

Methods, systems and apparatus for incorporating importance signaling tokens in generative neural network context blocks. In one aspect a user query is received and multiple data chunks for the user query are retrieved. Values of one or more significance metrics for each of one or more data chunks of the multiple data chunks are obtained. A context block for the user query is generated. The context block comprises the one or more data chunks and respective tokens that indicate the values of the one or more significance metrics for the one or more data chunks. An input that includes the user query and the context block is processed using a generative neural network to generate a response to the user query. The response to the user query is output.

20 Claims, 5 Drawing Sheets

(56) References Cited

OTHER PUBLICATIONS

Chen et al., "PaLI-X: On Scaling up a Multilingual Vision and Language Model," CoRR, Submitted on May 2023, arXiv:2305.18565v1, 30 pages.
Chowdhery et al., "PaLM: Scaling Language Modeling with Pathways," CoRR, Submitted on Apr. 2022, arXiv:2204.02311v1, 83 pages.
Gemini Team et al., "Gemini: A Family of Highly Capable MultiModal Models," CoRR, Submitted on Dec. 2023, arXiv:2312.11805v1, 62 pages.
Glaese et al., "Improving alignment of dialogue agents via targeted human judgements," CoRR, Submitted on Sep. 2022, arXiv:2209.14375v1, 77 pages.
Hoffmann et al., "Training Compute-Optimal Large Language Models," CoRR, Submitted on Mar. 2022, arXiv:2203.15556v1, 36 pages.
Lee et al., "RLAIF vs. RLHF: Scaling Reinforcement Learning from Human Feedback with AI Feedback," CoRR, Submitted on Sep. 2023, arXiv:2309.00267v1, 28 pages.
Ouyang et al., "Training language models to follow instructions with human feedback," CoRR, Submitted on Mar. 2022, arXiv:2203.02155v1, 68 pages.
Rafailov et al., "Direct Preference Optimization: Your Language Model is Secretly a Reward Model," CoRR, Submitted on May 2023, arXiv:2305.18290v1, 26 pages.
Raffel et al., "Exploring the Limits of Transfer Learning with a Unified Text-to-Text Transformer," CoRR, Submitted on Oct. 2019, arXiv:1910.10683v1, 52 pages.
Saharia et al., "Photorealistic Text-to-Image Diffusion Models with Deep Language Understanding," CoRR, Submitted on May 2022, arXiv:2205.11487v1, 46 pages.
Yu et al., "Scaling Autoregressive Models for Content-Rich Text-to-Image Generation," CoRR, Submitted on Jun. 2022, arXiv:2206.10789, 49 pages.

* cited by examiner

200

IMPORTANCE SIGNALING TOKENS IN GENERATIVE NEURAL NETWORK CONTEXT BLOCKS

BACKGROUND

This specification generally relates to performing retrieval-augmented generation (RAG) using a generative neural network.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Generative neural networks are machine learning models that are configured, through training, to perform a generative task to generate, as output, data that includes, for example, text data, image data, video data, audio data, or multimodal data that includes data in two or more different modalities. Example generative tasks include text generation, image synthesis, audio generation, video generation, code generation, or style transfer. In a RAG system, data sources are split into data chunks and indexed in a database. When a generative neural network included in the RAG system is queried, data chunks that are relevant to the query are retrieved from the database and added as a context block to an input to the generative neural network, along with the query. This enables the generative neural network to generate an output that is grounded in the retrieved information.

SUMMARY

This specification describes systems and methods for incorporating importance signaling tokens in generative neural network context blocks.

In general, one innovative aspect of the subject matter described in this specification may be embodied in methods that include the actions of receiving a user query; retrieving multiple data chunks for the user query; obtaining, for each of one or more data chunks of the multiple data chunks, values of one or more significance metrics for the data chunk; generating a context block for the user query, wherein the context block comprises the one or more data chunks and respective tokens that indicate the values of the one or more significance metrics for the one or more data chunks; processing an input comprising the user query and the context block using a generative neural network to generate a response to the user query; and outputting the response to the user query.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus (e.g., one or more computers or computer processors), cause the apparatus to perform the actions.

The foregoing and other embodiments can each optionally include one or more of the following features, alone or in combination. In some implementations the one or more significance metrics comprise one or more of credibility, relevance to the user query, sentiment, or quality.

In some implementations the user query comprises an input to a search engine and retrieving multiple data chunks for the user query comprises retrieving the multiple data chunks from a dynamically searchable external data source based on one or more source search signals.

In some implementations the method further comprises determining the values of the one or more significance metrics for the data chunk using the source search signals.

In some implementations the source search signals comprise one or more of domain authority scores, source types, fact checking scores, or publisher trust scores and the method further comprises determining a credibility value for the data chunk using the source search signals.

In some implementations the source search signals comprise one or more of keyword similarity scores, semantic similarity scores, click-through rates, or dwell times and the method further comprises determining a relevance value for the data chunk using the source search signals.

In some implementations the source search signals comprise one or more of readability scores, structure scores, use of citation scores, or grammar and spelling scores and the method further comprises determining a quality value for the data chunk using the source search signals.

In some implementations each data chunk of the multiple data chunks includes data from a respective data source and a credibility of the data chunk is based on a credibility of the respective source.

In some implementations the values of the one or more significance metrics for the data chunk comprise categorical values.

In some implementations the values of the one or more significance metrics for the data chunk comprise numerical values.

In some implementations generating the context block for the user query further comprises, for each of the one or more data chunks: combining the numerical values of the one or more significance metrics for the data chunk into a single numerical value, wherein the tokens that indicate the value of the one or more significance metrics for the data chunk indicate the single numerical value.

In some implementations generating the context block for the user query comprises, for each of the one or more data chunks: wrapping the data chunk with tokens that indicate the values of the one or more significance metrics for the data chunk, and adding the wrapped data chunk to the context block.

In some implementations wrapping the data chunk with tokens comprises prefixing a first sequence of tokens to the data chunk and suffixing a second sequence of tokens to the data chunk, wherein the first sequence of tokens indicates the values of the one or more significance metrics for the data chunk and the second sequence indicates an end of the data chunk.

In some implementations the data chunks are added to the context block in an arbitrary order.

In some implementations retrieving the multiple data chunks for the user query comprises retrieving data chunks from a vector database of predetermined data chunks.

In some implementations obtaining, for each of one or more data chunks of the multiple data chunks, the values of one or more significance metrics for the data chunk comprises retrieving predetermined values stored in the vector database.

In some implementations the method further comprises training the generative neural network using reinforcement learning on labeled training examples to adjust attention weights associated with data chunks in a context block using tokens that indicate values of significance metrics for the data chunks in the context block when processing a user query and the context block.

Some implementations of the subject matter described herein may realize, in certain instances, one or more of the following advantages.

Examples of the presently described techniques improve the accuracy, quality, and trustworthiness of responses generated by a generative neural network. For example, in the context of search engines, users expect accurate, trustworthy, and up-to-date information in response to input queries. However, the integration of generative neural networks and RAG systems into search engines introduces a potential issue: whilst these models can effectively retrieve and amalgamate relevant documents from a vast corpus of information, they often fail to retain and utilize the intrinsic quality or credibility of the retrieved sources.

Specifically, significance metrics such as relevance scores or credibility ratings associated with the retrieved documents are not effectively maintained within the generative neural network context block. This disconnection between the retrieved information and its reliability can lead to the generative network processing and reasoning over data chunks from data sources without adequately considering their varying levels of relevance, credibility, or quality. As a result, responses to input queries can inadvertently propagate misinformation or low-quality information, reducing the reliability of the responses. Without the ability to differentiate based on significance metrics, generative neural networks that leverage RAG systems risk compromising the overall quality, factual accuracy, and trustworthiness of the information delivered to users. This fundamental issue limits the effectiveness and reliability of generative neural network systems for information retrieval and response generation.

However, by incorporating special importance signaling tokens in the generative neural network context block as described herein, the generative neural network can attend to the information in the context block according to the importance indicated by the importance signaling tokens. This allows the generative neural network to directly recognize and prioritize information from more relevant and credible sources, which in turn enables the generative neural network to consistently generate high-quality, trustworthy, and credible responses.

In addition, examples of the presently described techniques address the so-called "lost in the middle" problem in generative neural networks that leverage RAG systems. Due to the positional biases inherent in generative neural networks, data chunks that are placed in the middle of the context block often receive less attention than data chunks that are placed near the beginning or end of the context block. This "lost in the middle" problem can cause the generative neural network to overlook or underutilize highly relevant information simply because of where the information appears in the input sequence. As a result, even when highly relevant data chunks are retrieved, important information placed mid-context can be ignored during generation, potentially degrading the quality or accuracy of the generated outputs.

However, as discussed above, by incorporating special importance signaling tokens in the generative neural network context block as described herein, the order in which the data chunks are added to the context block can be arbitrary, since the generative neural network attends to the information in the context block according to the importance indicated by the importance signaling tokens and not according to the position of the information. This allows the generative neural network to recognize and prioritize information from more relevant and credible sources, even when the information is placed in the middle of the context block.

In addition, examples of the presently described techniques achieve improved computational efficiency. By explicitly signaling importance, the generative neural network can be guided to focus its attention mechanism more effectively on the most critical parts of the context block. This can result in faster inference times or allow for processing longer contexts within the same computational budget compared to generative neural networks that rely solely on positional cues or implicit relevance detection.

In addition, examples of the presently described techniques achieve enhanced controllability and interpretability. The use of special tokens provides a clear mechanism to control the behavior of the generative neural network based on source characteristics. The weights or values of significance metrics can be adjusted (e.g., freshness can be prioritized over credibility for news-related queries) to steer the generation process. This also makes the reliance of the generative neural network on specific source attributes slightly more interpretable.

In addition, examples of the presently described techniques achieve improved handling of conflicting information. When retrieved data chunks present conflicting information, the significance tokens (e.g., credibility and relevance) provide a direct signal to the model on which piece of information might be more trustworthy or pertinent, leading to more robust synthesis in the generated response.

In addition, examples of the presently described techniques achieve simplified context ordering. As described above, since importance is explicitly marked, the generative neural network is less sensitive to the exact order in which data chunks are presented in the context block (beyond the inherent sequential nature of autoregressive models), which simplifies the context construction process as complex reordering strategies to mitigate positional bias are not required.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

This specification describes systems and methods for generating and incorporating data chunk significance metrics into a generative neural network context block. W hen a user queries the generative neural network, data chunks and values of significance metrics for the data chunks are retrieved, e.g., values that indicate a credibility, relevance, and quality of the data chunks. The data chunks are added to the context block with special tokens that indicate the values of significance metrics for the data chunks. This enables the generative neural network to attend to the data chunks in the context block according to the significance metrics for the data chunks, e.g., prioritize high quality information from more credible and relevant data sources.

Figure 1:
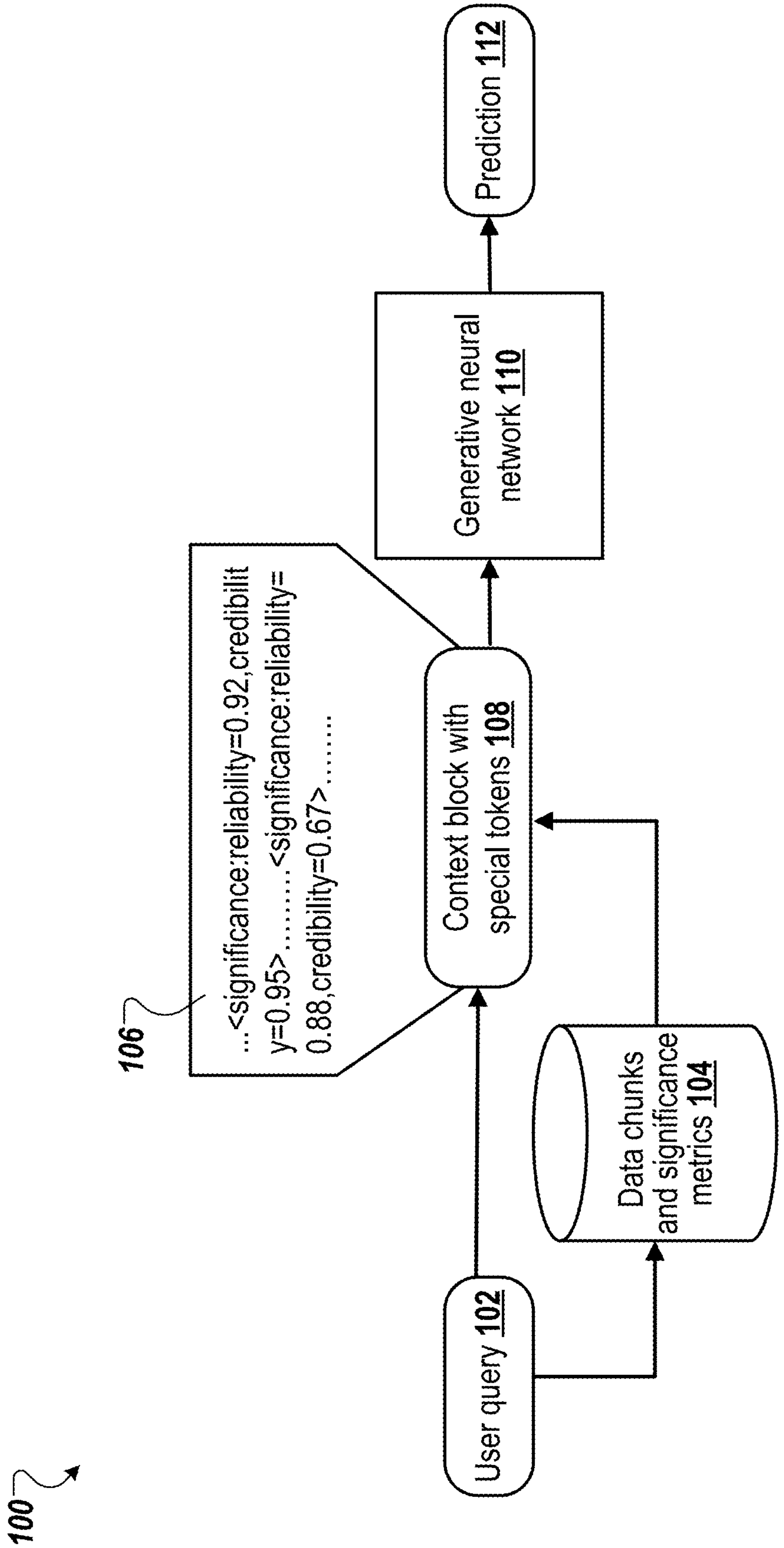
FIG. 1 is a conceptual diagram of a generative neural network system that incorporates significance metrics in a generative neural network context block through the use of special tokens.

FIG. 1 is a conceptual diagram 100 of a generative neural network system that incorporates significance metrics in a generative neural network context block through the use of special tokens.

In the example shown in FIG. 1, a user submits a user query 102 to the generative neural network system (in other implementations the query can be received from another system or entity). Multiple data chunks that are semantically similar to or aligned with the user query are retrieved from a database 104. Each data chunk includes data, e.g., text, images, audio, or multi-modal data, from a respective data source. Values of significance metrics for each data chunk are also retrieved from the database 104. The significance metrics for a data chunk can include one or more of a credibility of the data source from which the data chunk originates, a relevance of the data chunk to the user query 102, data chunk sentiment, or data chunk quality. In some implementations the values of the significance metrics can be determined based on source search signals used to retrieve the data sources from which the data chunks originate.

A context block for the user query is generated. Special tokens that indicate the values of the significance metrics for the data chunks are embedded along with the data chunks in the context block. For example, each data chunk can be wrapped with a respective sequence of tokens, e.g., sequence 106, that indicates the values of the significance metrics for the data chunk. The context block with the special tokens 108 is provided to the generative neural network 110. The generative neural network 110 processes the context block with the special tokens 108 to output a prediction 112. During the processing, the generative neural network 110 is configured to dynamically allocate or adjust attention to different parts of the context block with the special tokens 108 depending on the values of the significance metrics as indicated by the special tokens, e.g., increasing attention for parts of the context block that are highly relevant, highly credible, and/or of high quality. This allows the generative neural network 110 to recognize and prioritize information from more relevant and credible sources, which improves the accuracy and quality of the prediction 112.

Figure 2:
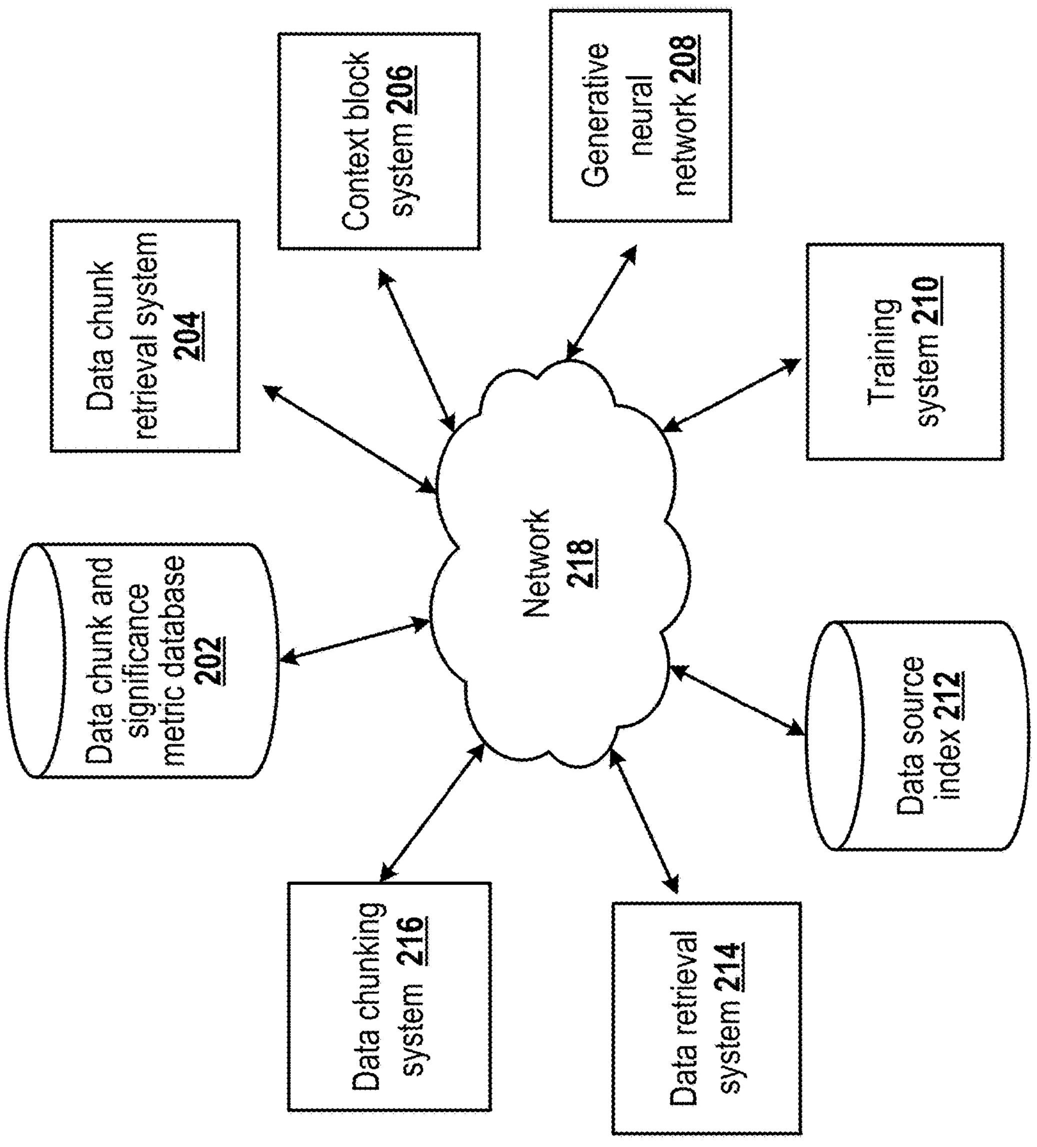
FIG. 2 is a block diagram of an example generative neural network system.

FIG. 2 is a block diagram of an example generative neural network system 200. The example system 200 is an example of a system implemented as computer programs on one or more computers in one or more locations, in which the systems, components, and techniques described herein can be implemented. The example system 200 includes a data chunk and significance metrics database 202, a data chunk retrieval system 204, a context block system 206, a generative neural network 208, a training system 210, a data source index 212, a data retrieval system 214, and a data chunking system 216. The components of the example system 200 can be connected via a network 218, e.g., a local area network (LAN), wide area network (WLAN), the Internet, or a combination thereof, which can be accessed over a wired and/or a wireless communications link.

The data chunk and significance metrics database 202 stores data chunks that can be included in a context block for the generative neural network 208. The data chunks are chunks of text that originate from respective data sources, e.g., data sources stored in data source index 212 as described in more detail below. The data chunks can be generated using a chunking method, e.g., recursive character text splitting, document-specific splitting, semantic chunking, or agentic chunking. In some implementations the data chunks included in the data chunk and significance metrics database 202 can have a predetermined maximum size, e.g., where the size is determined based on the size of the generative neural network context block.

The data chunk and significance metrics database 202 further stores embeddings for the data chunks. A n embedding is an ordered collection of numerical values, e.g., a vector of floating point or other numerical values. The embeddings for the data chunks can be generated using an embedding model, e.g., a Transformer or specialized embedding model such as a sentence Transformer. The embedding model can be trained to output fixed-size vector embeddings of input data chunks using an objective function, e.g., a contrastive loss that encourages embeddings of similar data chunks to be close and embeddings of dissimilar data chunks to be far apart or a classification loss that trains the model to produce embeddings that allow effective classification of relationships between data chunks.

The data chunk and significance metrics database 202 further stores values of significance metrics for some or all of the data chunks. The significance metrics are descriptive scores or labels that indicate how important or useful a data chunk is. For example, the significance metrics can include data chunk credibility, which indicates how trustworthy or reliable the information in a data chunk is. As another example, the significance metrics can include data chunk quality, which indicates how well written, informative or factually accurate a data chunk is. As another example, the significance metrics can include sentiment, which indicates an emotional tone of the data chunk.

In some implementations the values of the significance metrics for a data chunk can be determined using source search signals used to retrieve the data source from which the data chunk originates from. For example, as described in more detail below with reference to the data retrieval system 214, the credibility of a data chunk can be determined using source search signals that include, e.g., domain authority, data source credibility, update frequency score, or citation counts. As another example, the quality of a data chunk can be determined using source search signals that include, e.g., readability scores, grammar scores, or factual consistency. A s another example, the sentiment of a data chunk can be determined using source search signals that include, e.g., signals derived from natural language sentiment analysis models.

In other implementations the values of the significance metrics for a data chunk can be determined based on the data chunk and information characterizing the data source from which the data chunk originates from, e.g., data source domain. For example, a generative neural network can be configured, through training, to process an input data chunk and information characterizing the data source from which the data chunk originates from and output values of significance metrics for the data chunk.

For completeness it is noted that the significance metrics can also include data chunk relevance, which indicates how relevant a data chunk is to a user query. However, the relevance of a data chunk is dynamically determined by the system when a user query is received, as described in more detail below with reference to the data chunk retrieval system 204, and therefore data chunk relevance values are not stored in the data chunk and significance metrics database 202.

In some implementations the values of the significance metrics can be categorical values. For example, the credibility of a data chunk can be represented as "highly credible," "credible," or "low credibility" and the sentiment of a data chunk can be represented as "sarcastic," "comical" or "neutral." In other implementations the values of the significance metrics can be normalized numerical values, e.g., "credibility: 0.9, quality: 0.9."

The data chunk retrieval system 204 is configured to query the data chunk and significance metrics database 202 to retrieve data chunks and significance metrics for the data chunks. For example, when the system 200 receives a query from a user, the data chunk retrieval system 204 can determine an embedding of the user query and use the embedding to identify a top predetermined number of data chunks in the data chunk and significance metrics database 202 that are relevant to the user query, e.g., by identifying embeddings of data chunks stored in the data chunk and significance metrics database 202 that are similar to the embedding of the user query. Embeddings can be determined to be similar based on a distance between two embeddings, e.g., a cosine similarity, Euclidean distance, Manhattan distance, or dot product.

The data chunk retrieval system 204 is configured to retrieve the data chunks that are relevant to the user query (referred to as relevant data chunks) from the data chunk and significance metrics database 202. The data chunk retrieval system 204 also retrieves values of significance metrics for the relevant data chunks. The number of data chunks retrieved from the data chunk and significance metrics database 202 can depend on, e.g., a size of the context block for the generative neural network 208.

In some implementations, the data chunk retrieval system 204 can add also determine and add relevance values to the significance metrics for the relevant data chunks. For example, the data chunk retrieval system 204 can use the similarity between the relevant data chunk and the user query (or between an embedding of the relevant data chunk and an embedding of the user query) as the relevance value. In some implementations the relevance values can be categorical values such as "highly relevant" or "relevant," where each category corresponds to a predetermined range of similarity values. In other implementations the relevance values can be numerical values such as "relevance: 0.95" or "relevance: 0.80." Because the data chunks have already been identified as being relevant to the user query, it can be advantageous to include numerical relevance values in the significance metrics since numerical values are more precise compared to categorical values.

The context block system 206 is configured to obtain a user query, data chunks that are relevant to the user query, and values of significance metrics for the data chunks from the data chunk retrieval system 204. The context block system 206 uses the user query, data chunks, and significance values to generate a context block for input into the generative neural network 208.

The context block system 206 is configured to wrap each data chunk with special tokens that indicate the corresponding values of the significance metrics for the data chunk. For example, the context block can prefix each data chunk with a sequence of tokens that indicate the corresponding values of the significance metrics for the data chunk. Optionally, the context block can also suffix the data chunk with a sequence of tokens that indicates the end of the data chunk. For example, the data chunk "London's tallest building is currently The Shard next to London Bridge, which is over 1000 feet tall" could be wrapped as "<significance:credibility=0.98; relevance=0.99>London's tallest building is currently The Shard next to London Bridge, which is over 1000 feet tall</significance>"

In some implementations a data chunk can have conflicting values of the significance metrics. For example, a data chunk can be highly relevant to a user query but have low credibility or low quality. In these implementations, it can be beneficial to combine values of different significance metrics into a single value. For example, the context block system 206 can be configured to use a predetermined mapping to map any categorical values of significance metrics to corresponding numerical values, e.g., map "highly relevant" to 0.9, "relevant" to 0.75, etc., as needed. The context block system 206 can then combine numerical values of the significance metrics for each data chunk into a single value for the data chunk. The combination of numerical values can be a weighted combination, where the weights control how much each significance metric contributes to the single value and are system parameters that can be determined in advance.

The context block system 206 is configured to add, e.g., concatenate, the wrapped data chunks to the user query to generate the context block for the user query.

The generative neural network 208 is a machine learning model that is configured to receive a context block from the context block system 206 as input. As described above, the context block is an input sequence of tokens that includes a prompt, e.g., a query input by a user. The prompt can be a question, statement, or other form of textual input. The context block also includes one or more data chunks that are relevant to the prompt. The data chunks can be wrapped with special tokens that indicate values of significance metrics for the data chunks, as described above.

The generative neural network 208 is configured, through training, to process the context block by analyzing the semantic and synaptic relationships between words or phrases included in the context block and uses learned patterns to generate an output sequence of tokens that represents a response to the prompt. The generative neural network 208 is an auto-regressive neural network that generates each particular token in the output sequence conditioned on a current input sequence that includes an input sequence included in the network input and any tokens that precede the particular token in the output sequence, i.e., the tokens that have already been generated for any previous positions in the output sequence that precede the particular position of the particular token.

A s a particular example, the generative neural network 208 can have any of a variety of Transformer-based neural network architectures, e.g., encoder-only Transformer architectures, encoder-decoder Transformer architectures, decoder-only Transformer architectures, diffusion Transformer architectures, other attention-based architectures, and so on.

Examples of such Transformer-based neural network architectures include those described in Colin Raffel, et al., Exploring the limits of transfer learning with a unified text-to-text transformer. arXiv preprint arXiv:1910.10683, 2019; Daniel Adiwardana, et al., Towards a human-like open-domain chatbot. CoRR, abs/2001.09977, 2020; Aakanksha Chowdhery, et al., PaLM: Scaling Language M odeling with Pathways, arXiv preprint arXiv:2204.02311; Rohan Anil, et al., Palm 2 technical report. arXiv preprint arXiv:2305.10403, 2023; and Gemini Team, et al., Gemini: a family of highly capable multimodal models. arXiv preprint arXiv:2312.11805 (2023).

For example, the generative neural network 208 may be a language model neural network. Examples of generative language model neural networks include Sparrow (Glaese, et al., arXiv:2209.14375), Chinchilla (Hoffmann, et al., arXiv:2203.15556), and PaLM 2 (A nil, et al., arXiv:2305: 10403).

A s another example, the generative neural network 208 may be a multi-modal model neural network, e.g., a vision language model (V L M) neural network. Examples of multi-modal neural networks include Flamingo (Alayrac, et al., arXiv: 2204.14198), PaLI (Chen, et al., arXiv: 2209.06794), and PaLI-X (Chen, et al., arXiv: 2305.18565).

As another example, the generative neural network 208 may be a foundation model neural network. A foundation model neural network is a large-scale machine learning model trained on a broad data set that can be adapted and fine-tuned for a wide variety of applications and downstream tasks. Examples of foundation model neural networks include Imagen (Saharia, et al., arXiv: 2205.11487) and Parti (Y u, et al., arXiv: 2206.10789).

The generative neural network 208 can include an input block, followed by one or more intermediate blocks, followed by an output block. The input block can receive an input to the generative neural network 208.

The input block can include an embedding layer. The embedding layer includes parameters that represent elements of an embedding matrix which can be used to map each token in the vocabulary of tokens into a corresponding embedding of the token.

The one or more intermediate blocks can include one or more attention blocks, e.g., one or more local attention blocks, one or more global attention blocks, or both. A local attention block is a block that includes a local attention mechanism, while a global attention block is a block that includes a global attention mechanism. The generative neural network 208 is configured, through training, to implement an adaptive attention mechanism that attends to data chunks in the context block according to the values of the significance metrics as indicated by the special tokens included in the context block. That is, the generative neural network 208 can dynamically allocate or adjust attention to different parts of the context block depending on the values of the significance metrics as indicated by the special tokens, e.g., increasing attention for parts of the context block that are highly relevant, highly credible, and/or of high quality. Such dynamic adjustments allows the generative neural network 208 to focus more on relevant information and reduce the processing of irrelevant or less important details, which can lead to better performance and efficiency.

The output block can generate an output of the generative neural network 208. For example, the output can include a score distribution, e.g., a probability distribution, over tokens in a vocabulary of tokens. The score distribution assigns a respective score, e.g., a respective probability, to each token in the vocabulary of tokens.

The output block can include a de-embedding layer. The de-embedding layer includes parameters that represent elements of a de-embedding matrix which can be used to map an embedding to a corresponding token in the vocabulary of tokens. In some implementations, the de-embedding matrix can be a transpose of the embedding matrix included in the input block, such that each parameter of the de-embedding matrix has a corresponding parameter in the embedding matrix.

The vocabulary of tokens can include any of a variety of tokens that represent text symbols or other symbols. For example, the vocabulary of tokens can include one or more of: characters, sub-words, words, punctuation marks, numbers, or other symbols that appear in a corpus of natural language text and/or computer code. The presently described special tokens will typically not be included in a standard vocabulary and can be to the tokenizer and vocabulary as special tokens. Alternatively, a structured representation (e.g., decomposing credibility=0.98 into existing tokens such as <, significance, :, credibility, =, 0.98, >) could be used if adding new tokens to the vocabulary is problematic.

The training system 210 is configured to train the generative neural network 208 to attend to data chunks in an input context block according to values of the significance metrics as indicated by the special tokens included in the context block. In some implementations the training system 210 can apply reinforcement learning techniques, e.g., reinforcement learning from human feedback or reinforcement learning from AI feedback, or direct preference optimization techniques to train the generative neural network 208, where during training attention heads of the attention blocks learn to assign different weights to data chunks included in a context block depending on the corresponding special tokens. For example, the training system 210 can provide the generative neural network 208 with an input (context block) from a dataset of training examples. The generative neural network 208 processes an input included in a training example, adjusting the attention based on special tokens included in the context block as necessary, to obtain a predicted output. The training system 210 can then train the generative neural network 208 to maximize a reward for the predicted output. Example training techniques that could be used include those described in Ouyang, et al., Training language models to follow instructions with human feedback, arXiv preprint: 2203.02155, 2022; Rafailov, et al., Direct Preference Optimization: Your Language Model is Secretly a Reward Model, arXiv preprint: 2305.18290, 2023; Lee, et al., RLAIF vs. RLHF: Scaling Reinforcement Learning from Human Feedback with AI Feedback, arXiv preprint: 2309.00267, 2023.

In some implementations the generative neural network 208 can be trained through fine tuning a pre-trained foundation generative neural network on a dataset specifically constructed for the task of incorporating importance signaling tokens into context blocks. The dataset can include examples of prompts, relevant data chunks, the corresponding special significance tokens embedded within the context, and target outputs (or preference pairs for methods such as DPO or reward signals for RLHF). During fine-tuning, the generative neural network learns to associate the special tokens with the underlying concepts of the significance metrics and adjusts the attention mechanism and generation process accordingly to leverage the values of the significance metrics effectively, guided by a fine-tuning objective.

The data source index 212 is a structured repository of data sources that can be used by the system 200 to generate the data chunks and significance metrics stored in the data chunk and significance metric database 202. The data sources can include structured data sources, e.g., knowledge bases or databases, unstructured data sources, e.g., unstructured text documents including reports, articles, research papers, etc., web content, e.g., scraped or curated content from websites, user generated content, e.g., emails, chats, or user feedback, and domain specific resources, e.g., medical literature or legal documents. In some implementations the data source index 212 can be a search engine index that stores and ranks indexed data for efficient query-based retrieval.

The data source index 212 further includes source search signals for the data sources. Source search signals are signals that can be used to evaluate and prioritize data sources based on attributes of the data sources including, e.g., credibility, relevance, freshness, and user engagement. The source search signals can include signals that are based on domain knowledge, metadata, or system ranking rules. For example, the source search signals can include a domain authority score that is assigned to a data source based on the corresponding domain's reputation, e.g., a governmental or academic domain can be assigned a higher domain authority score than a blog.

As another example, the source search signals can include data source credibility, e.g., where peer-reviewed articles are assigned higher credibility scores compared to user generated content.

As another example, the source search signals can include an update frequency score, e.g., where data sources that have been updated within a recent time period are assigned higher scores than data sources that have not been updated within the recent time.

As another example, the source search signals can include a readability score, e.g., where data sources that are well written are assigned higher readability scores than data sources that are written in a colloquial or sarcastic manner.

As another example, the source search signals can include a fact checking score, e.g., where data sources that are factually accurate are assigned higher fact checking scores than data sources that are not factually accurate or have not been checked for factual accuracy.

Other source search signals can be dynamically computed or obtained when data sources are retrieved from the data source index 212 including, e.g., a relevance score that is based on a textual similarity between an input query and a data source or a user engagement score which is calculated in real time based on user behavior such as user clicks, reading time, etc. In some implementations the data retrieval system 214 can be configured to compute such dynamic source search signals for a data source when the data retrieval system 214 retrieves the data source from the data source index 212 at query time.

The data retrieval system 214 is configured to retrieve data sources and source search signals for the data sources from the data source index 212. In some implementations the data sources can be retrieved in response to receiving a user query. For example, the data retrieval system 214 can use an embedding of the query to identify data sources in the data source index 212 that are relevant to the query, e.g., by identifying embeddings of data that are similar to the embedding of the query. Embeddings can be determined to be similar if a distance between two embeddings, e.g., a cosine similarity, Euclidean distance, Manhattan distance, or dot product, is less than a predetermined threshold. In these implementations the data retrieval system 214 can be further configured to rank and filter data sources identified as being relevant to the query using the corresponding source search signals.

In other implementations the data sources can be retrieved offline before a user query is received, e.g., according to content-based heuristics such as keyword presence, topic classification, or structural patterns.

The data retrieval system 214 is further configured to determine values of significance metrics for the retrieved data sources using the source search signals for the data sources. In some implementations the values of the significance metrics can be determined as weighted averages of subsets of the source search signals, as described in more detail below with reference to FIG. 4.

The data chunking system 216 is configured to obtain data sources from the data retrieval system 214 and divide text included in the data sources into smaller data chunks. The data chunking system 216 can be configured to implement a chunking method, e.g., recursive character text splitting, document-specific splitting, semantic chunking, or agentic chunking, to generate the data chunks. In some implementations the data chunks generated by the data chunking system 204 can have a predetermined maximum size, e.g., where the size is determined based on the size of the generative neural network context block.

The data chunking system 216 is further configured to generate embeddings for the data chunks. A n embedding is an ordered collection of numerical values, e.g., a vector of floating point or other numerical values. The data chunking system 216 can generate the embeddings for the data chunks using an embedding model, e.g., a Transformer or specialized embedding model such as a sentence Transformer. The embedding model can be trained to output fixed-size vector embeddings of input data chunks using an objective function, e.g., a contrastive loss that encourages embeddings of similar data chunks to be close and embeddings of dissimilar data chunks to be far apart or a classification loss that trains the model to produce embeddings that allow effective classification of relationships between data chunks.

The data chunks, embeddings for the data chunks, and significance metrics for the data chunks are stored in the data chunk and significance metric database 202. The significance metrics for the data chunks can be based on the significance metrics for the data sources determined by the data retrieval system 214. For example, significance metrics for a particular data source can be assigned to data chunks that originate from the data source.

Figure 3:
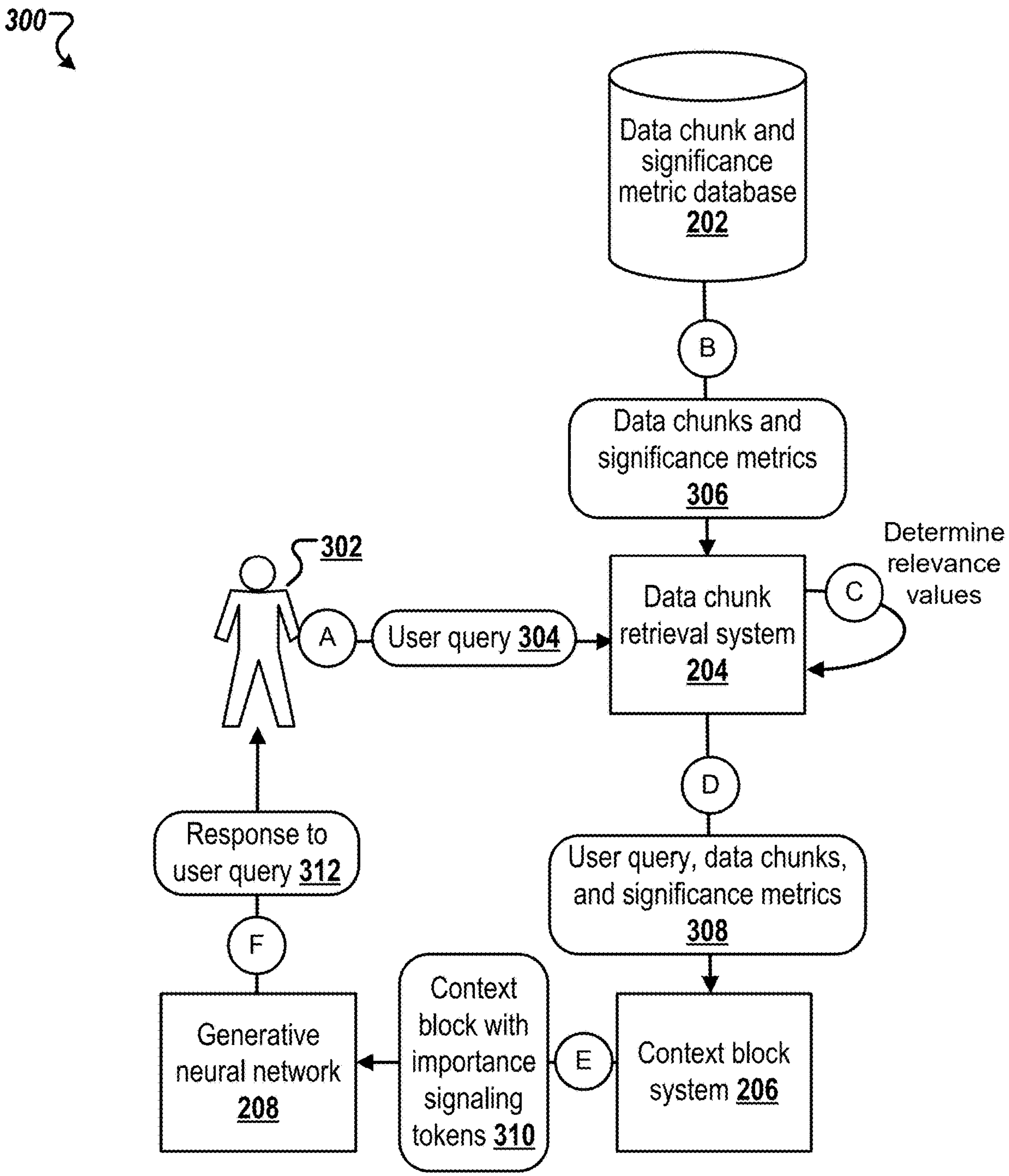
FIG. 3 is a block diagram of operations performed by the generative neural network system of FIG. 2 during an example process for generating a response to a user query.

FIG. 3 is a block diagram 300 of operations performed by the generative neural network system 200 of FIG. 2 during an example process for generating a response to a user query. The block diagram 300 illustrates the example process as including stages (A)-(F). However, in some implementations the process can include fewer or more stages.

During stage (A) of the example process, a user 302 provides a user query 304. During stage (B), the data chunk retrieval system 204 retrieves data chunks and significance metric values 306 for the user query from the data chunk and significance metric database 202. The data chunks are data chunks that are relevant to the user query, e.g., semantically similar to the user query. For example, the data chunk retrieval system 204 can generate an embedding of the user query and perform a similarity search between the embedding of the user query and pre-computed embeddings of data chunks stored in the data chunk and significance metric database 202 to identify data chunks that are relevant to the user query, e.g., based on a similarity metric such as cosine similarity, Euclidean distance, Manhattan distance, or dot product. The data chunk retrieval system 204 can then retrieve the data chunks that are relevant to the user query and significance metric values for the data chunks that are relevant to the user query.

The significance metric values retrieved from the data chunk and significance metric database 202 can include one or more of data chunk credibility, which indicates how trustworthy or reliable the information in a data chunk is, data chunk quality, which indicates how well written, informative or factually accurate a data chunk is, or sentiment, which indicates an emotional tone of the data chunk. The significance metric values can be based on source search signals used to generate the data chunks, as described in more detail below with reference to FIG. 4.

During stage (C), the data chunk retrieval system 204 determines relevance values for the data chunks. The relevance values indicate how relevant a data chunk is to a user query. For example, the data chunk retrieval system 204 can use the similarities between the data chunks and the user query (or between embeddings of the data chunks and an embedding of the user query) as respective relevance values for the user query. Alternatively or in addition, the data chunk retrieval system 204 can determine a relevance value for a data chunk using a keyword similarity between the data chunk and the user query, click-through rates of the data source from which the data chunk originates (which can also be stored in the data chunk and significance metric database), or dwell times of the data source from which the data chunk originates (which can also be stored in the data chunk and significance metric database).

During stage (D), the data chunk retrieval system 204 provides the user query, data chunks for the user query and significance metrics for the data chunks to the context block system 206. The significance metrics for the data chunks can include values of significance metrics stored in the data chunk and significance metric database 202 and/or the relevance values of the data chunks computed during stage (C). The context block system 206 generates a context block using the data chunks and the values of the significance metrics. The context block system 206 wraps each data chunk with special tokens that indicate the values of the significance metrics for the data chunk. In some implementations the special tokens can indicate the value of each significance metric separately, e.g., <significance: credibility=0.98, relevance=0.8, quality=0.89>. In other implementations the context block system 206 can determine a single value for the significance metrics, e.g., as an average of the individual significance metric values. The special tokens can then indicate the single value, e.g., <significance:0.89>. The context block system 206 then adds the wrapped data chunks to the user query to generate a context block with importance signaling tokens 310.

During stage (E), the context block system 206 provides the context block with the importance signaling tokens 310 to the generative neural network 208. During stage (F), the generative neural network 208 processes the context block 310 and begins decoding tokens to generate a response 312 to the user query 304 that is returned to the user 302.

Figure 4:
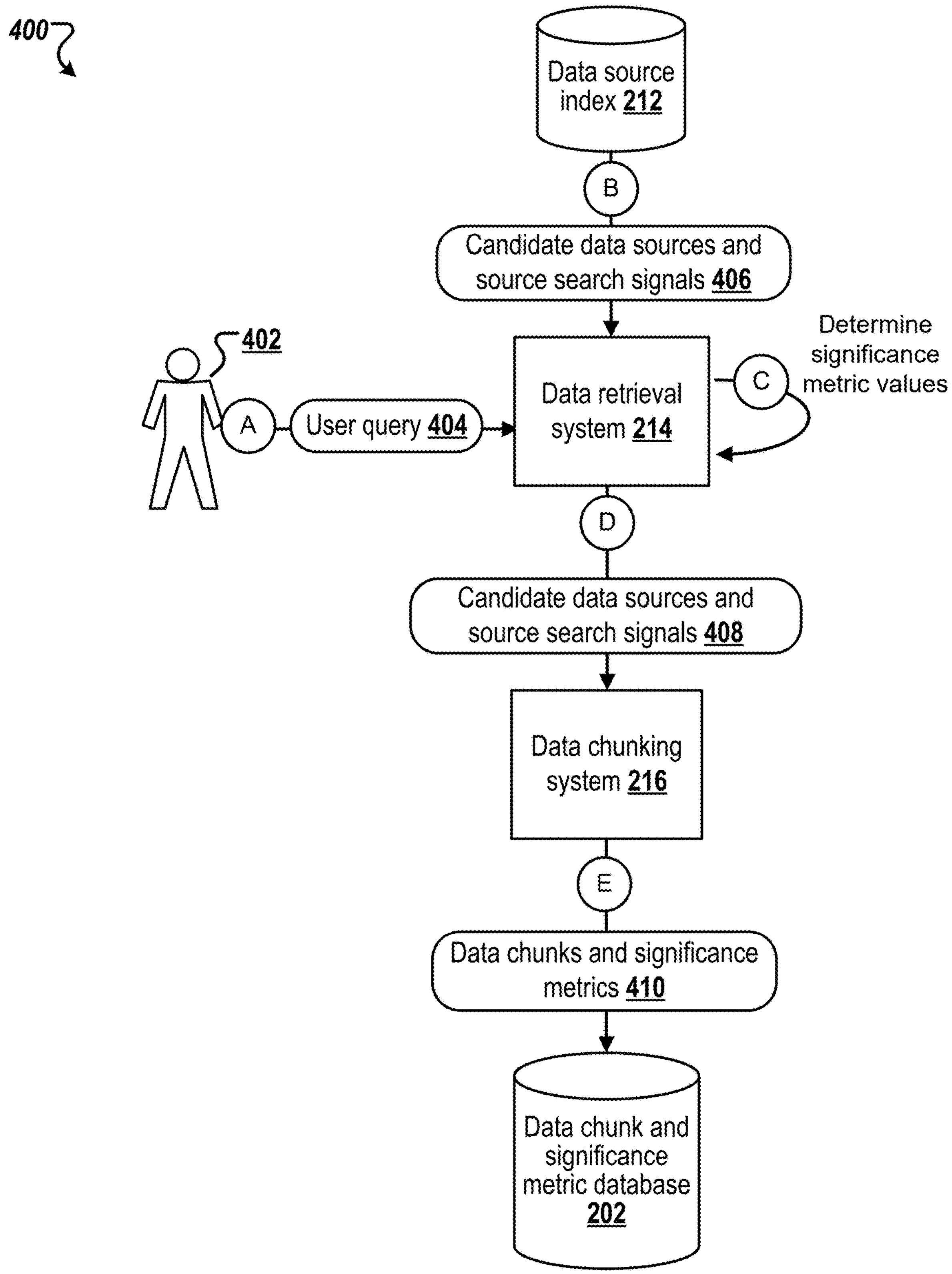
FIG. 4 is a block diagram of operations performed by the generative neural network system of FIG. 2 during an example process for generating data chunks and significance metrics based on source search signals.

FIG. 4 is a block diagram 400 of operations performed by the generative neural network system 200 of FIG. 2 during an example process for generating data chunks and significance metrics based on source search signals. The block diagram 400 illustrates the example process as including stages (A)-(E). However, in some implementations the process can include fewer or more stages. In some implementations stages (A)-(E) of the example process shown in FIG. 4 can precede stages (B)-(F) of FIG. 3, i.e., where the user query 304 in FIG. 3 is the same as user query 404 of FIG. 4.

During stage (A) of the example process, a user 402 provides a user query 404. During stage (B), the data retrieval system 214 uses the user query 404 to retrieve candidate data sources and source search signals 406 from the data source index 212. For example, the data retrieval system 214 can perform a keyword-based search, vector-based semantic retrieval, or hybrid method to identify candidate data sources that are relevant to the user query 404. The source search signals for the candidate data sources can include, e.g., domain authority, data source credibility, update frequency score, citation counts, readability scores, grammar scores, factual consistency, or signals derived from natural language sentiment analysis models.

During stage (C), the data retrieval system 214 uses the source search signals to determine values of significance metrics for the candidate data sources. For example, the data retrieval system 214 can determine a credibility value for a data source using a domain authority score for the data source, a data source type (e.g., whether the data source is a peer reviewed paper, a governmental website, or a personal blog), a fact checking score for the data source, or a publisher trust score for the data source (e.g., whether the source follows ethical journalism practices). In some implementations information including one or more of authoritative backlinks (links from other known credible sources), website age or history, presence of contact information or about us sections, the use of HTTPS, or, for academic sources, journal impact factor or conference tier can be used to determine the credibility value. The credibility value can be determined as an average of the (normalized) source signals or as a weighted average, where the weights control how much each source signal contributes to the credibility value and are system parameters that can be determined in advance.

As another example, the data retrieval system 214 can determine a relevance value for the data source using keyword similarity (between the data sources and a user query) scores, semantic similarity (between the data sources and a user query) scores, click-through rates of the data source, or dwell times of the data source. In some implementations information including one or more of beyond keyword/semantic similarity and user engagement (CTR/dwell time), query-document topic match (using topic models), freshness/recency (publication date, last modified date, content update frequency, or temporal signals in text), or user location (for geographically relevant queries) can be used to determine the relevance value. A gain, the relevance value can be determined as an average of the (normalized) source signals or as a weighted average.

As another example, the data retrieval system 214 can determine a quality value for the data source using readability scores, structure scores, use of citation scores, or grammar and spelling scores. In some implementations information including an originality score (that penalizes plagiarism or highly duplicated content), mobile friendliness, page load speed, an absence of intrusive interstitials/ads, information completeness or depth (e.g., word count, presence of multimedia elements, data tables), or structural integrity (e.g., use of headings, lists) can be used to determine the quality value. Again, the quality value can be determined as an average of the (normalized) source signals or as a weighted average.

As another example, the data retrieval system 214 can determine a sentiment value for the data source using, e.g., signals derived from natural language sentiment analysis models, and/or information including review scores or star ratings associated with the data source or content of the data source (e.g., for product pages or local businesses) or an analysis of a comment section tone if available.

During stage (D), the data retrieval system 214 provides the candidate data sources and significance metrics for the candidate data sources 408 to the data chunking system 216. The data chunking system 216 implements a chunking method, e.g., recursive character text splitting, document-specific splitting, semantic chunking, or agentic chunking, to divide text included in the candidate data sources into a set of smaller data chunks. In some implementations the data chunking system 216 can identify one or more data chunks that are unrelated to the user query, e.g., data chunks that include metadata or are directed to side topics. For example, the data chunking system 216 can apply relevance scoring to each data chunk in the set based on, e.g., keyword matches, embedding similarities, a machine learning model trained to score user query-data chunk relevance, or predetermined heuristics. The data chunking system 216 can then remove the unrelated data chunks, e.g., data chunks with a relevance score lower than a predetermined threshold, from the set of smaller data chunks. The data chunking system 216 then generates an embedding of each data chunk in the set.

During stage (E), the data chunking system 216 provides the data chunks, data chunk embeddings, and significance metrics to the data chunk and significance metric database 202. As described above, the significance metrics for the data chunks are based on the significance metrics for the data sources determined during stage (C). For example, significance metrics for a particular data source can be assigned to data chunks that originate from the data source.

Figure 5:
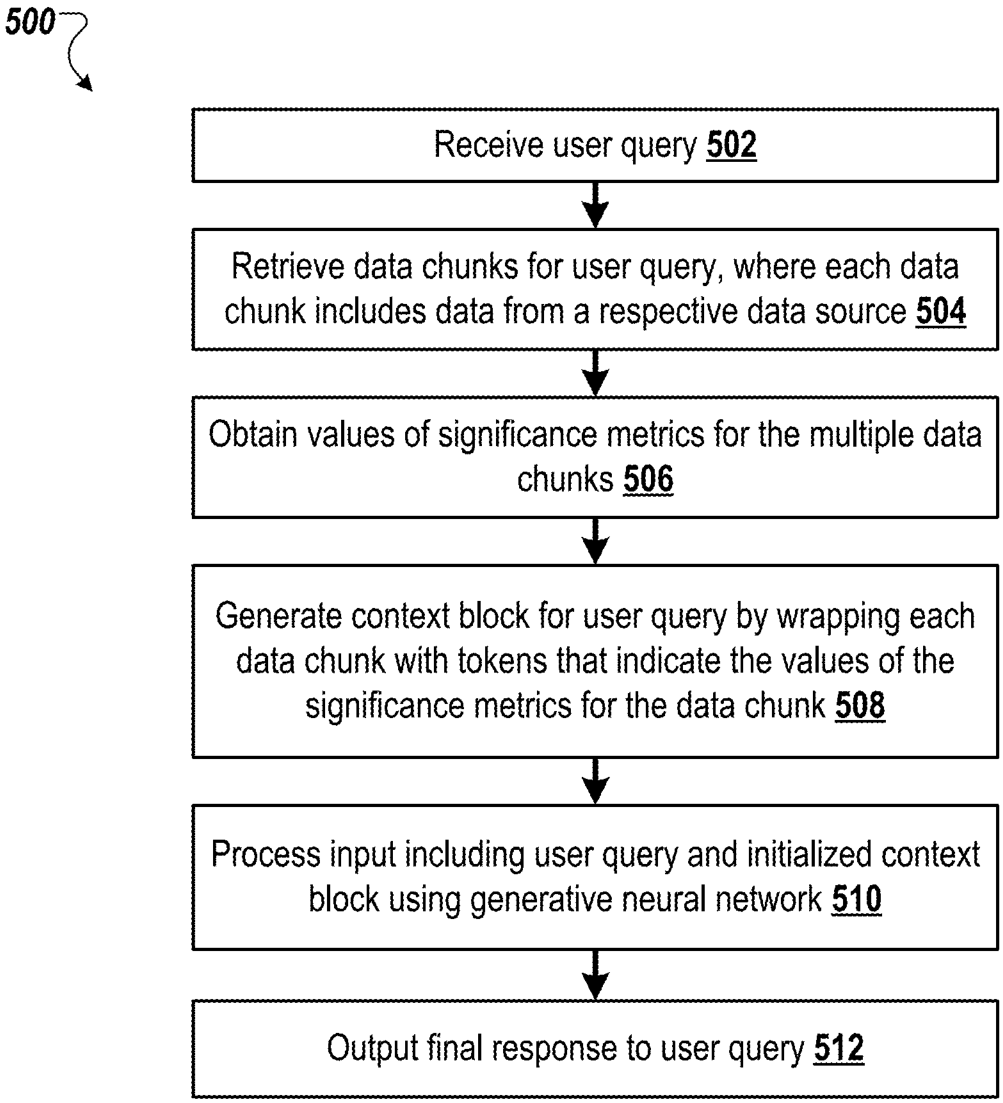
FIG. 5 is a flow chart of an example process for generating a response to a user query using a context block that includes importance signaling tokens.

FIG. 5 is a flow chart of an example process 500 for generating a response to a user query using a context block that includes importance signaling tokens. For convenience, the process 500 will be described as being performed by a system of one or more computers located in one or more locations. For example, a generative neural network system, e.g., the system 200 of FIG. 2, appropriately programmed, can perform example process 500.

The system receives a user query (step 502). The system retrieves multiple data chunks for the user query (step 504). Each data chunk for the user query is semantically similar to or aligned with the user query and includes data from a respective data source, e.g., a knowledge base or database, text document, web content, or domain specific resource.

The system obtains values of significance metrics for the multiple data chunks (step 506). The significance metrics can include one or more of credibility, relevance to the user query, sentiment, or quality. The values of the significance metrics for the multiple data chunks can include categorical values and/or numerical values. In some implementations the values of the significance metrics for the multiple data chunks can be stored with the multiple data chunks and the system can retrieve the values of significance metrics with the multiple data chunks. In other implementations the system can determine the values of significance metrics for the multiple data chunks.

For example, in some implementations the user query received at step 502 can be an input to a search engine. In these implementations, the multiple data chunks can be retrieved from a dynamically searchable external data source based on one or more source search signals. The system can then use the source search signals to determine the values of the significance metrics for the multiple data chunks. For example, in some implementations the source search signals can include one or more of domain authority scores, source types, fact checking scores, or publisher trust scores. In these implementations the system can determine a credibility value for the data chunk using the source search signals. As another example, in some implementations the source search signals can include one or more of keyword similarity scores, semantic similarity scores, click-through rates, or dwell times. In these implementations the system can determine a relevance value for the data chunk using the source search signals. A s another example, in some implementations the source search signals can include one or more of readability scores, structure scores, use of citation scores, or grammar and spelling scores. In these implementations the system can determine a quality value for the data chunk using the source search signals.

The system generates a context block for the user query (step 508). The system wraps each data chunk with special tokens that indicate the values of the significance metrics for the data chunk and adds the wrapped data chunk to the context block. For example, the system can prefix a first sequence of tokens to the data chunk and suffix a second sequence of tokens to the data chunk, where the first sequence of tokens indicates the values of the one or more significance metrics for the data chunk and the second sequence indicates an end of the data chunk. In some implementations the system can combine numerical values of multiple significance metrics for a data chunk into a single numerical value before wrapping the data chunk. The wrapped chunks can be added in an arbitrary order, since the use of the special tokens mitigates position-based attention biases in the generative neural network (sometimes referred to as the "lost in the middle problem."

The system processes an input that includes the user query and the context block using a trained generative neural network to generate a response to the user query (step 510). The generative neural network can be trained using reinforcement learning to adjust attention weights associated with data chunks in a context block using special tokens when processing a user query and the context block. That is, during the processing, the generative neural network learns to adjust attention weights associated with each wrapped data chunk based on the special tokens included in the wrapped data chunk. For example, the generative neural network can increase attention weights associated with a wrapped data chunk when the special tokens included in the wrapped data chunk indicate that the data chunk is particularly important and decrease the attention weights associated with a wrapped data chunk when the special tokens included in the wrapped data chunk indicate that the data chunk is less important.

The system outputs the response to the user query (step 512).

In this specification, the term "configured" is used in relation to computing systems and environments, as well as computer program components. A computing system or environment is considered "configured" to perform specific operations or actions when it possesses the necessary software, firmware, hardware, or a combination thereof, enabling it to carry out those operations or actions during operation. For instance, configuring a system might involve installing a software library with specific algorithms, updating firmware with new instructions for handling data, or adding a hardware component for enhanced processing capabilities. Similarly, one or more computer programs are "configured" to perform particular operations or actions when they contain instructions that, upon execution by a computing device or hardware, cause the device to perform those intended operations or actions.

The embodiments and functional operations described in this specification can be implemented in various forms, including digital electronic circuitry, software, firmware, computer hardware (encompassing the disclosed structures and their structural equivalents), or any combination thereof. The subject matter can be realized as one or more computer programs, essentially modules of computer program instructions encoded on a tangible non-transitory storage medium for execution by or to control the operation of a computing device or hardware. The storage medium can be a storage device such as a hard drive or solid-state drive (SSD), a storage medium, a random or serial access memory device, or a combination of these. Additionally or alternatively, the program instructions can be encoded on a transmitted signal, such as a machine-generated electrical, optical, or electromagnetic signal, designed to carry information for transmission to a receiving device or system for execution by a computing device or hardware. Furthermore, implementations may leverage emerging technologies like quantum computing or neuromorphic computing for specific applications, and may be deployed in distributed or cloud-based environments where components reside on different machines or within a cloud infrastructure.

The term "computing device or hardware" refers to the physical components involved in data processing and encompasses all types of devices and machines used for this purpose. Examples include processors or processing units, computers, multiple processors or computers working together, graphics processing units (GPUs), tensor processing units (TPUs), and specialized processing hardware such as field-programmable gate arrays (FPGAs) or application-specific integrated circuits (ASICs). In addition to hardware, a computing device or hardware may also include code that creates an execution environment for computer programs. This code can take the form of processor firmware, a protocol stack, a database management system, an operating system, or a combination of these elements. Embodiments may particularly benefit from utilizing the parallel processing capabilities of GPUs, in a General-Purpose computing on Graphics Processing Units (GPGPU) context, where code specifically designed for GPU execution, often called kernels or shaders, is employed. Similarly, TPU s excel at running optimized tensor operations crucial for many machine learning algorithms. By leveraging these accelerators and their specialized programming models, the system can achieve significant speedups and efficiency gains for tasks involving artificial intelligence and machine learning, particularly in areas such as computer vision, natural language processing, and robotics.

A computer program, also referred to as software, an application, a module, a script, code, or simply a program, can be written in any programming language, including compiled or interpreted languages, and declarative or procedural languages. It can be deployed in various forms, such as a standalone program, a module, a component, a subroutine, or any other unit suitable for use within a computing environment. A program may or may not correspond to a single file in a file system and can be stored in various ways. This includes being embedded within a file containing other programs or data (e.g., scripts within a markup language document), residing in a dedicated file, or distributed across multiple coordinated files (e.g., files storing modules, sub-programs, or code segments). A computer program can be executed on a single computer or across multiple computers, whether located at a single site or distributed across multiple sites and interconnected through a data communication network. The specific implementation of the computer programs may involve a combination of traditional programming languages and specialized languages or libraries designed for GPGPU programming or TPU utilization, depending on the chosen hardware platform and desired performance characteristics.

In this specification, the term "engine" broadly refers to a software-based system, subsystem, or process designed to perform one or more specific functions. A n engine is typically implemented as one or more software modules or components installed on one or more computers, which can be located at a single site or distributed across multiple locations. In some instances, one or more dedicated computers may be used for a particular engine, while in other cases, multiple engines may operate concurrently on the same one or more computers. Examples of engine functions within the context of AI and machine learning could include data pre-processing and cleaning, feature engineering and extraction, model training and optimization, inference and prediction generation, and post-processing of results. The specific design and implementation of engines will depend on the overall architecture and the distribution of computational tasks across various hardware components, including CPUs, GPUs, TPUs, and other specialized processors.

The processes and logic flows described in this specification can be executed by one or more programmable computers running one or more computer programs to perform functions by operating on input data and generating output. Additionally, graphics processing units (GPUs) and tensor processing units (TPUs) can be utilized to enable concurrent execution of aspects of these processes and logic flows, significantly accelerating performance. This approach offers significant advantages for computationally intensive tasks often found in AI and machine learning applications, such as matrix multiplications, convolutions, and other operations that exhibit a high degree of parallelism. By leveraging the parallel processing capabilities of GPUs and TPUs, significant speedups and efficiency gains compared to relying solely on CPUs can be achieved. Alternatively or in combination with programmable computers and specialized processors, these processes and logic flows can also be implemented using specialized processing hardware, such as field-programmable gate arrays (FPGAs) or application-specific integrated circuits (ASICs), for even greater performance or energy efficiency in specific use cases.

Computers capable of executing a computer program can be based on general-purpose microprocessors, special-purpose microprocessors, or a combination of both. They can also utilize any other type of central processing unit (CPU). Additionally, graphics processing units (GPUs), tensor processing units (TPUs), and other machine learning accelerators can be employed to enhance performance, particularly for tasks involving artificial intelligence and machine learning. These accelerators often work in conjunction with CPUs, handling specialized computations while the CPU manages overall system operations and other tasks. Typically, a CPU receives instructions and data from read-only memory (ROM), random access memory (RA M), or both. The elements of a computer include a CPU for executing instructions and one or more memory devices for storing instructions and data. The specific configuration of processing units and memory will depend on factors like the complexity of the AI model, the volume of data being processed, and the desired performance and latency requirements. Embodiments can be implemented on a wide range of computing platforms, from small embedded devices with limited resources to large-scale data center systems with high-performance computing capabilities. The system may include storage devices like hard drives, SSDs, or flash memory for persistent data storage.

Computer-readable media suitable for storing computer program instructions and data encompass all forms of non-volatile memory, media, and memory devices. Examples include semiconductor memory devices such as read-only memory (ROM), solid-state drives (SSDs), and flash memory devices; hard disk drives (HDDs); optical media; and optical discs such as CDs, DVDs, and Blu-ray discs. The specific type of computer-readable media used will depend on factors such as the size of the data, access speed requirements, cost considerations, and the desired level of portability or permanence.

To facilitate user interaction, embodiments of the subject matter described in this specification can be implemented on a computing device equipped with a display device, such as a liquid crystal display (LCD) or an organic light-emitting diode (OLED) display, for presenting information to the user. Input can be provided by the user through various means, including a keyboard), touchscreens, voice commands, gesture recognition, or other input modalities depending on the specific device and application. Additional input methods can include acoustic, speech, or tactile input, while feedback to the user can take the form of visual, auditory, or tactile feedback. Furthermore, computers can interact with users by exchanging documents with a user's device or application. This can involve sending web content or data in response to requests or sending and receiving text messages or other forms of messages through mobile devices or messaging platforms. The selection of input and output modalities will depend on the specific application and the desired form of user interaction.

Machine learning models can be implemented and deployed using machine learning frameworks, such as TensorFlow or JAX. These frameworks offer comprehensive tools and libraries that facilitate the development, training, and deployment of machine learning models.

Embodiments of the subject matter described in this specification can be implemented within a computing system comprising one or more components, depending on the specific application and requirements. These may include a back-end component, such as a back-end server or cloud-based infrastructure; an optional middleware component, such as a middleware server or application programming interface (API), to facilitate communication and data exchange; and a front-end component, such as a client device with a user interface, a web browser, or an app, through which a user can interact with the implemented subject matter. For instance, the described functionality could be implemented solely on a client device (e.g., for on-device machine learning) or deployed as a combination of front-end and back-end components for more complex applications. These components, when present, can be interconnected using any form or medium of digital data communication, such as a communication network like a local area network (LAN) or a wide area network (WAN) including the Internet. The specific system architecture and choice of components will depend on factors such as the scale of the application, the need for real-time processing, data security requirements, and the desired user experience.

The computing system can include clients and servers that may be geographically separated and interact through a communication network. The specific type of network, such as a local area network (LAN), a wide area network (WAN), or the Internet, will depend on the reach and scale of the application. The client-server relationship is established through computer programs running on the respective computers and designed to communicate with each other using appropriate protocols. These protocols may include HTTP, TCP/IP, or other specialized protocols depending on the nature of the data being exchanged and the security requirements of the system. In certain embodiments, a server transmits data or instructions to a user's device, such as a computer, smartphone, or tablet, acting as a client. The client device can then process the received information, display results to the user, and potentially send data or feedback back to the server for further processing or storage. This allows for dynamic interactions between the user and the system, enabling a wide range of applications and functionalities.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer implemented method comprising:

receiving a user query;

retrieving multiple data chunks for the user query;

obtaining, for each of one or more data chunks of the multiple data chunks, values of one or more significance metrics for the data chunk;

generating a context block for the user query, wherein the context block comprises the one or more data chunks and respective tokens that indicate the values of the one or more significance metrics for the one or more data chunks;

processing an input comprising the user query and the context block using a generative neural network to generate a response to the user query; and outputting the response to the user query.

2. The method of claim 1, wherein the one or more significance metrics comprise one or more of credibility, relevance to the user query, sentiment, or quality.

3. The method of claim 1, wherein the user query comprises an input to a search engine and retrieving multiple data chunks for the user query comprises retrieving the multiple data chunks from a dynamically searchable external data source based on one or more source search signals.

4. The method of claim 3, further comprising determining the values of the one or more significance metrics for the data chunk using the source search signals.

5. The method of claim 4, wherein the source search signals comprise one or more of domain authority scores, source types, fact checking scores, or publisher trust scores and the method further comprises determining a credibility value for the data chunk using the source search signals.

6. The method of claim 4, wherein the source search signals comprise one or more of keyword similarity scores, semantic similarity scores, click-through rates, or dwell times and the method further comprises determining a relevance value for the data chunk using the source search signals.

7. The method of claim 4, wherein the source search signals comprise one or more of readability scores, structure scores, use of citation scores, or grammar and spelling scores and the method further comprises determining a quality value for the data chunk using the source search signals.

8. The method of claim 4, wherein each data chunk of the multiple data chunks includes data from a respective data source and a credibility of the data chunk is based on a credibility of the respective source.

9. The method of claim 1, wherein the values of the one or more significance metrics for the data chunk comprise categorical values.

10. The method of claim 1, wherein the values of the one or more significance metrics for the data chunk comprise numerical values.

11. The method of claim 10, wherein generating the context block for the user query further comprises, for each of the one or more data chunks:

combining the numerical values of the one or more significance metrics for the data chunk into a single numerical value, wherein the tokens that indicate the value of the one or more significance metrics for the data chunk indicate the single numerical value.

12. The method of claim 1, wherein generating the context block for the user query comprises, for each of the one or more data chunks:

wrapping the data chunk with tokens that indicate the values of the one or more significance metrics for the data chunk, and adding the wrapped data chunk to the context block.

13. The method of claim 12, wherein wrapping the data chunk with tokens comprises prefixing a first sequence of tokens to the data chunk and suffixing a second sequence of tokens to the data chunk, wherein the first sequence of tokens indicates the values of the one or more significance metrics for the data chunk and the second sequence indicates an end of the data chunk.

14. The method of claim 1, wherein the data chunks are added to the context block in an arbitrary order.

15. The method of claim 1, wherein retrieving the multiple data chunks for the user query comprises retrieving data chunks from a vector database of predetermined data chunks.

16. The method of claim 15, wherein obtaining, for each of one or more data chunks of the multiple data chunks, the values of one or more significance metrics for the data chunk comprises retrieving predetermined values stored in the vector database.

17. The method of claim 1, further comprising training the generative neural network using reinforcement learning on labeled training examples to adjust attention weights associated with data chunks in a context block using tokens that indicate values of significance metrics for the data chunks in the context block when processing a user query and the context block.

18. A system comprising one or more computers and one or more storage devices storing instructions that are operable, when executed by the one or more computers, to cause the one or more computers to perform operations comprising:

receiving a user query;

retrieving multiple data chunks for the user query;

obtaining, for each of one or more data chunks of the multiple data chunks, values of one or more significance metrics for the data chunk;

generating a context block for the user query, wherein the context block comprises the one or more data chunks and respective tokens that indicate the values of the one or more significance metrics for the one or more data chunks;

processing an input comprising the user query and the context block using a generative neural network to generate a response to the user query; and outputting the response to the user query.

19. A non-transitory computer storage medium encoded with instructions that, when executed by one or more computers, cause the one or more computers to perform operations comprising:

receiving a user query;

retrieving multiple data chunks for the user query;

obtaining, for each of one or more data chunks of the multiple data chunks, values of one or more significance metrics for the data chunk;

generating a context block for the user query, wherein the context block comprises the one or more data chunks and respective tokens that indicate the values of the one or more significance metrics for the one or more data chunks;

processing an input comprising the user query and the context block using a generative neural network to generate a response to the user query; and outputting the response to the user query.

20. The system of claim 18, wherein generating the context block for the user query comprises, for each of the one or more data chunks:

wrapping the data chunk with tokens that indicate the values of the one or more significance metrics for the data chunk, comprising prefixing a first sequence of tokens to the data chunk and suffixing a second sequence of tokens to the data chunk, wherein the first sequence of tokens indicates the values of the one or more significance metrics for the data chunk and the second sequence indicates an end of the data chunk; and adding the wrapped data chunk to the context block.

* * * * *